US010916162B2

(12) United States Patent
Chenault et al.

(10) Patent No.: US 10,916,162 B2
(45) Date of Patent: Feb. 9, 2021

(54) LICENSE PLATE FRAME CLIP APPARATUS FOR DISPLAYING INDICIA THEREON AND METHODS OF USING THE SAME

(71) Applicants: John Adam Chenault, Carpentersville, IL (US); Dawn Michele Patterson, Carpentersville, IL (US)

(72) Inventors: John Adam Chenault, Carpentersville, IL (US); Dawn Michele Patterson, Carpentersville, IL (US)

( * ) Notice: Subject to any disclaimer, the term of this patent is extended or adjusted under 35 U.S.C. 154(b) by 0 days.

(21) Appl. No.: 16/378,014

(22) Filed: Apr. 8, 2019

(65) Prior Publication Data

US 2020/0035132 A1 Jan. 30, 2020

Related U.S. Application Data

(60) Provisional application No. 62/653,799, filed on Apr. 6, 2018.

(51) Int. Cl.
*G09F 7/18* (2006.01)
*B60R 13/00* (2006.01)
*F16B 2/20* (2006.01)

(52) U.S. Cl.
CPC .............. *G09F 7/18* (2013.01); *B60R 13/005* (2013.01); *F16B 2/20* (2013.01); *G09F 2007/1843* (2013.01); *G09F 2007/1865* (2013.01)

(58) Field of Classification Search
CPC ............... G09F 7/18; G09F 2007/1843; G09F 2007/1865; G09F 21/048; G09F 2007/1882; G09F 2007/1895; B60R 13/005; B60R 13/105; F16B 2/20; Y10T 24/344; Y10T 24/44017; Y10T 24/44624; Y10T 24/44573; Y10T 24/45246
See application file for complete search history.

(56) References Cited

U.S. PATENT DOCUMENTS

| | | | | |
|---|---|---|---|---|
| 1,283,037 A | * | 10/1918 | Baltzley | A41F 11/02 24/528 |
| 1,498,889 A | * | 6/1924 | Snell | G09F 7/08 40/210 |
| 1,728,789 A | * | 9/1929 | Devins | G09F 3/201 40/658 |
| 1,863,902 A | | 8/1930 | Hanson | |
| 1,964,002 A | | 6/1934 | Lester | |
| 2,189,521 A | * | 2/1940 | King | A47G 1/0627 40/799 |
| 2,661,558 A | | 12/1953 | Salisbury | |
| 2,869,261 A | | 1/1959 | Audette | |
| 3,696,920 A | * | 10/1972 | Lahay | A61B 50/20 206/370 |

(Continued)

*Primary Examiner* — Cassandra Davis
(74) *Attorney, Agent, or Firm* — Scherrer Patent & Trademark Law, P.C.; Stephen T. Scherrer; Monique A. Morneault

(57) ABSTRACT

License plate frame clip apparatuses provide a display surface to display indicia, such as an image, words, symbols, or other like indicia. The clip apparatuses comprise at least one slot comprising a recessed surface, a first end, a second end, a first side wall extending from the recessed surface, and a second side wall extending from the recessed surface, each of the side walls comprising a flange configured to hook onto a back side of a license plate frame when the frame is disposed within the slot. Methods of using the same are further provided.

18 Claims, 3 Drawing Sheets

(56) References Cited

U.S. PATENT DOCUMENTS

| | | | |
|---|---|---|---|
| 4,924,611 A | 5/1990 | Shaw | |
| 4,986,013 A * | 1/1991 | Pollack | A47G 1/0605 |
| | | | 40/606.17 |
| 5,237,767 A * | 8/1993 | Kringel | G09F 3/204 |
| | | | 248/231.41 |
| 5,383,294 A | 1/1995 | Shen | |
| 5,867,874 A * | 2/1999 | Simpson | A42B 1/24 |
| | | | 24/10 R |
| 6,347,472 B1 | 2/2002 | Dominguez | |
| 6,519,882 B1 * | 2/2003 | Shuen | G09F 7/18 |
| | | | 40/200 |
| 6,553,695 B1 | 4/2003 | Wang | |
| 7,350,323 B1 | 4/2008 | Basos | |
| 8,291,627 B1 | 10/2012 | Spencer et al. | |
| 8,578,640 B1 * | 11/2013 | Krankkala | G09F 7/18 |
| | | | 40/209 |
| 8,938,896 B2 | 1/2015 | Spencer et al. | |
| D749,209 S * | 2/2016 | Uhlenkamp | D24/128 |
| D752,493 S | 3/2016 | Spencer et al. | |
| 2003/0079381 A1 * | 5/2003 | Arens | B60R 13/005 |
| | | | 40/210 |
| 2003/0079382 A1 | 5/2003 | Arens et al. | |
| 2011/0252676 A1 | 10/2011 | Stringer | |
| 2014/0033584 A1 | 2/2014 | Falkner | |
| 2016/0365015 A1 * | 12/2016 | Young | G09F 7/18 |
| 2018/0144648 A1 * | 5/2018 | Naqvi | A44C 17/0241 |

* cited by examiner

LICENSE PLATE FRAME CLIP APPARATUS FOR DISPLAYING INDICIA THEREON AND METHODS OF USING THE SAME

The present invention claims priority to U.S. Prov. Pat. App. No. 62/653,799, titled "License Plate Frame Clip Apparatus for Displaying Indicia Thereon and Methods of Using the Same," filed Apr. 6, 2018, which is incorporated herein by reference in its entirety.

TECHNICAL FIELD

The present invention relates to license plate frame clip apparatuses. More specifically, the clip apparatuses of the present invention provide a display surface to display indicia, such as an image, words, symbols, or other like indicia. The clip apparatuses comprise at least one slot comprising a recessed surface, a first end, a second end, a first side wall extending from the recessed surface, and a second side wall extending from the recessed surface, each of the side walls comprising a flange on terminal ends thereof configured to hook onto a back side of a license plate frame when the frame is disposed within the slot. Methods of using the same are further provided.

BACKGROUND

License plates are prominently displayed on vehicles and have been since the dawn of automobiles. License plates display a code unique to that vehicle, and may be utilized to identify ownership information about the vehicle by authorities. This may be particularly useful when a vehicle is involved in an incident, such as an accident or a crime. Moreover, license plates may further be utilized for identification purposes for payment of tolls, registration of the vehicles at events, and other like functionality.

It is common for vehicle owners to accessorize their vehicles with adornments. For example, many vehicle owners post stickers, magnets, window clings or other like elements onto vehicles to communicate to others that may share the road. Specifically, it is common to see political stickers, good- (or bad-) will messages, unique identification messages, and other like information on automobiles. For example, it is common to see window clings or stickers presenting representations of family members on the back windows of automobiles.

While it is common for owners to wish to display information or other like communications on a vehicle, many may feel reticent to do so due to the permanence of these signs. For example, bumper stickers may be stuck with adhesive to the rear of a vehicle, such as on a back bumper or elsewhere on a vehicle, but the owner may have extreme difficulty removing the stickers due to the adhesive. This may be particularly important if the sticker communicates an idea that the owner now does not agree with, such as if the automobile is sold. In some cases, a potential buyer of a vehicle may not purchase the vehicle if there is a sticker on the vehicle with which the owner does not agree. Likewise, an owner may change his or her position on a matter, and may wish to remove a sticker that communicates an idea with which the owner no longer agrees.

Window clings may help ameliorate the permanence of these communication adornments. However, window clings typically are placed on the insides of windows, and as such may be difficult to see externally. Moreover, window clings on the outsides of vehicles face difficulties with weather and vehicle wash stations that may inadvertently remove the window clings from the outsides of the automobile.

Magnets may also be utilized to help ameliorate the permanence of communication adornments, but not all vehicles may be able to utilize magnets, depending on the material of the automobile. While many automobiles are made of steel, some are made of aluminum which would not hold a magnet. Moreover, many external parts of vehicles, such as bumpers and the like, are made of plastics or composite materials that are also non-magnetic.

License plates and areas surrounding license plates are natural areas for placing adornments. Many people naturally look at license plates, as the license plates themselves may display the vehicle identification information in a funny or an amusing manner, with so-called "vanity" plates. In many cases, license plates are held within a frame, typically made from a thermoplastic material, that helps hold the license plate on the vehicle. In some cases, the license plate frame may be molded with communication information and adornments that communicate ideas to others. However, it is often difficult to change license plate frames, as they are typically bolted into the rear of the vehicle, so when information communicated on the license plate frame is desired to be changed, users may have difficulty doing so.

In other cases, adornments may be removably placed onto license plate frames, such as in blank areas of the license plate frames. However, oftentimes, the adornment may be either too permanent (making it difficult to change) or not permanent enough (causing the adornment to fall off during regular use of the vehicle). In many cases, the adornment is place on an area of the license plate frame that is deformed or otherwise permanently changed to accommodate the adornment, such as with holes or apertures.

A need, therefore, exists for apparatuses for displaying indicia on vehicles. More specifically, a need exists for apparatuses that may be placed on license plate frames that are easily seen, without interfering with the information contained on the license plate.

Moreover, a need exists for apparatuses for displaying indicia on license plate frames of vehicles that may be easily changed and swapped. More specifically, a need exists for apparatuses for displaying indicia on license plate frames that may provide sufficient permanence so as not to be inadvertently knocked off of the license plate frame, yet be easily removed when desired by an owner or user thereof.

In addition, a need exists for apparatuses for displaying indicia on license plate frames that require no permanent alteration of the license plate frame. More specifically, a need exists for apparatuses for displaying indicia on license plate frames that may be placed and held on the license plate frame that does not require the addition of holes or apertures within the license plate frame, or specially-designed license plate frames to accommodate the apparatuses.

SUMMARY OF THE INVENTION

The present invention relates to license plate frame clip apparatuses. More specifically, the clip apparatuses of the present invention provide a display surface to display indicia, such as an image, words, symbols, or other like indicia. The clip apparatuses comprise at least one slot comprising a recessed surface, a first end, a second end, a first side wall extending from the recessed surface, and a second side wall extending from the recessed surface, each of the side walls comprising a flange on terminal ends thereof configured to hook onto a back side of a license plate frame when the frame is disposed within the slot. Methods of using the same are further provided.

To this end, in an embodiment of the present invention, a clip apparatus configured to attach to an automobile license plate frame is provided. The clip apparatus comprises: a body comprising a first surface and a second surface, the first surface comprising indicia thereon, and the second surface configured to attach to an automobile license plate frame, wherein the second surface comprises: a first side wall extending from the second surface and a second side wall extending from the second surface, the first side wall and the second side wall running parallel to each other and defining a first slot therebetween, the first side wall having a first flange extending toward the second side wall and extending roughly perpendicular to the first sidewall, the second side wall having a second flange extending toward the first side wall and extending roughly perpendicular to the second sidewall.

In an embodiment, the second side wall adjustably extends from the second surface.

In an embodiment, the second side wall comprises an extending flange, and the body comprises a receiving slot configured to accept the extending flange, wherein the position of the second side wall is adjustable by sliding the extending flange into and out of the receiving slot of the body.

In an embodiment, the first slot is bounded on sides thereof by the first and second sidewalls and a bottom by the second surface.

In an embodiment, the second side wall is longer than the first side wall.

In an embodiment, the clip apparatus further comprises: a third side wall extending from the second surface and a fourth side wall extending from the second surface, the third side wall and the fourth side wall running parallel to each other and defining a second slot therebetween, the third side wall having a third flange extending toward the fourth side wall and extending roughly perpendicular to the third side wall, the fourth side wall having a fourth flange extending toward the third side wall and extending roughly perpendicular to the fourth side wall.

In an embodiment, the second slot is bounded on sides thereof by the third and fourth sidewalls and a bottom by the second surface.

In an embodiment, the fourth side wall is longer than the third side wall.

In an embodiment, the second side wall and the fourth sidewall and connected together to form a single bridging leg between the first and second slots.

In an embodiment, the first slot and the second slot run parallel to each other.

In an embodiment, the clip apparatus further comprises: an element on the first surface, the element selected from the group consisting of an audio module, a light, a screen, and combinations thereof.

In an embodiment, the clip apparatus further comprises an adhesive within the first slot on the second surface.

In an alternate embodiment of the present invention, a system for clipping a clip apparatus to an automobile license plate frame is provided. The system comprises a clip apparatus configured to attach to an automobile license plate frame comprising a body comprising a first surface and a second surface, the first surface comprising indicia thereon, and the second surface configured to attach to an automobile license plate frame, wherein the second surface comprises a first side wall extending from the second surface and a second side wall extending from the second surface, the first side wall and the second side wall running parallel to each other and defining a first slot therebetween, the first side wall having a first flange extending toward the second side wall and extending roughly perpendicular to the first sidewall, the second side wall having a second flange extending toward the first side wall and extending roughly perpendicular to the second sidewall; and an automobile license plate frame comprising a frame section having a front surface, a first side edge and an opposing second side edge, and a rear surface, wherein the frame section of the automobile license plate frame is positioned within the first slot.

In an embodiment, the first slot is bounded on sides thereof by the first and second sidewalls and a bottom by the second surface, and further wherein the front surface of the frame section is disposed adjacent the second surface of the clip apparatus within the first slot.

In an embodiment, the first flange engages the first side edge of the automobile license plate frame and the second flange engages the second side edge of the automobile license plate frame.

In an embodiment, the clip apparatus further comprises a third side wall extending from the second surface and a fourth side wall extending from the second surface, the third side wall and the fourth side wall running parallel to each other and defining a second slot therebetween, the third side wall having a third flange extending toward the fourth side wall and extending roughly perpendicular to the third side wall, the fourth side wall having a fourth flange extending toward the third side wall and extending roughly perpendicular to the fourth side wall.

In an embodiment, the second side wall and the fourth side wall are connected together to from a single bridging leg between the first and second slots.

In an embodiment, the first slot and the second slot run parallel to each other.

In an embodiment, the first slot comprises an adhesive, wherein the adhesive binds the front surface of the automobile license plate frame to the second surface of the clip apparatus.

In an embodiment, the clip apparatus further comprises an element on the first surface, the element selected from the group consisting of an audio module, a light, a screen, and combinations thereof.

It is, therefore, an advantage and objective of the present invention to provide apparatuses for displaying indicia on vehicles.

More specifically, it is an advantage and objective of the present invention to provide apparatuses that may be placed on license plate frames that are easily seen, without interfering with the information contained on the license plate.

Moreover, it is an advantage and objective of the present invention to provide apparatuses for displaying indicia on license plate frames of vehicles that may be easily changed and swapped.

More specifically, it is an advantage and objective of the present invention to provide apparatuses for displaying indicia on license plate frames that may provide sufficient permanence so as not to be inadvertently knocked off of the license plate frame, yet be easily removed when desired by an owner or user thereof.

In addition, it is an advantage and objective of the present invention to provide apparatuses for displaying indicia on license plate frames that require no permanent alteration of the license plate frame.

More specifically, it is an advantage and objective of the present invention to provide apparatuses for displaying indicia on license plate frames that may be placed and held on the license plate frame that does not require the addition of holes or apertures within the license plate frame, or specially-designed license plate frames to accommodate the apparatuses.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to license plate frame clip apparatuses. More specifically, the clip apparatuses of the present invention provide a display surface to display indicia, such as an image, words, symbols, or other like indicia. The clip apparatuses comprise at least one slot comprising a recessed surface, a first end, a second end, a first side wall extending from the recessed surface, and a second side wall extending from the recessed surface, each of the side walls comprising a flange configured to hook onto a back side of a license plate frame when the frame is disposed within the slot. Methods of using the same are further provided.

Figure 1:
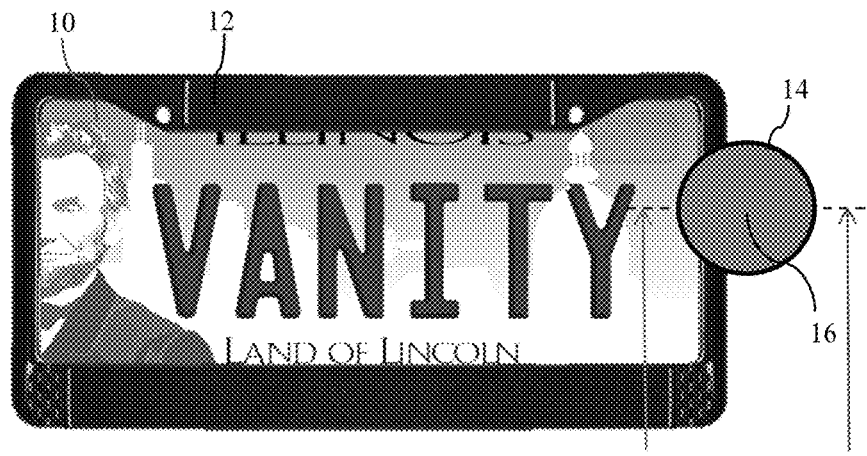
FIG. 1 illustrates a front view of a license plate, a license plate frame, and a clip apparatus disposed on the license plate frame in an embodiment of the present invention.
Figure 3:
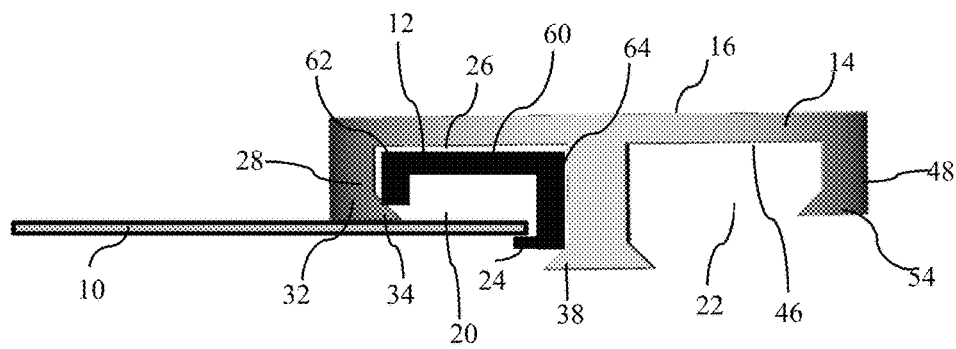
FIG. 3 illustrates a cross-sectional view of a license plate frame clip apparatus along line in an embodiment of the present invention.
Figure 4:
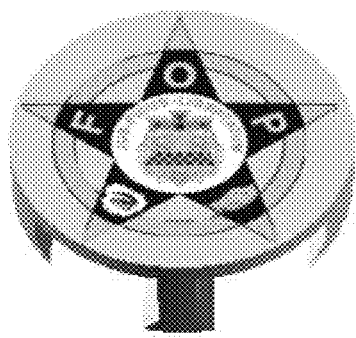
FIG. 4 illustrates a front perspective view of a round clip apparatus having indicia thereon in an embodiment of the present invention.
Figure 5:
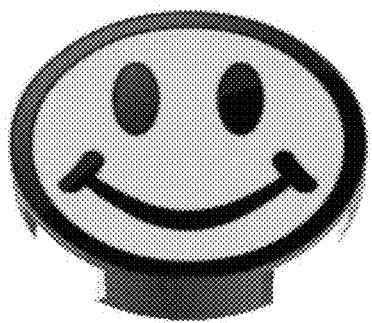
FIG. 5 illustrates a front perspective view of a round clip apparatus having alternate indicia thereon in an alternate embodiment of the present invention.
Figure 6:
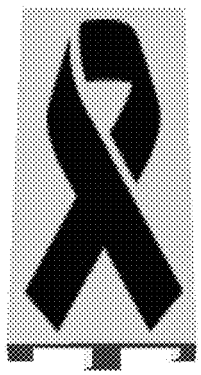
FIG. 6 illustrates a front perspective view of a rectangular-shaped clip apparatus having alternate indicia thereon in an alternate embodiment of the present invention.

Now referring to the drawings, wherein like numerals refer to like parts, FIG. 1 illustrates a license plate 10 within a license plate frame 12, and further having a license plate frame clip apparatus 14 disposed thereon in an embodiment of the present invention. The license plate clip apparatus may be clipped to an arm of the license plate frame as illustrated in FIG. 3, and discussed in more detail below. The license plate frame clip apparatus comprises a front face 16 upon which indicia, such as words, symbols, images, colors, or other like indicia may be placed for viewing by others. FIGS. 4-6 illustrate various embodiments showing different indicia that may be contained on the front surface 16 of the license plate frame clip apparatus. However, it should be noted that the front surface 16 may contain any indicia, and should not be limited as described herein. Thus, the clip apparatus 14 may be disposed directly to the license plate frame, and extend on and over an arm of the license plate frame without interfering with lettering or numbering on the license plate 10.

Figure 2A:
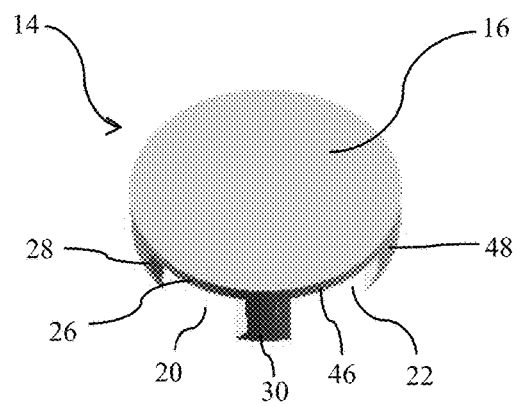
FIG. 2A illustrates a front perspective view of a license plate frame clip apparatus in an embodiment of the present invention.
Figure 2B:
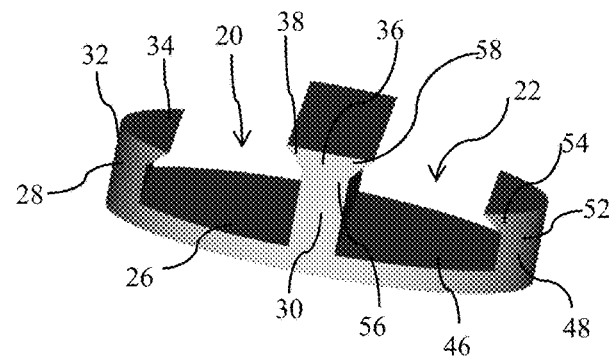
FIG. 2B illustrates a rear perspective view of a license plate frame clip apparatus in an embodiment of the present invention.

FIG. 2A illustrates a front perspective view of the clip apparatus 14 in an embodiment of the present invention. FIG. 2B illustrates a rear perspective view of the clip apparatus 14 in an embodiment of the present invention. The clip apparatus 14 may comprise a first slot 20 and a second slot 22 disposed adjacent each other and running parallel to each other. The first and second slots 20, 22 may be roughly sized to fit a license plate frame portion 24 of the license plate frame 12, as illustrated below in FIG. 3. First slot 20 may have a recessed surface 26, and disposed on a first side of the recessed surface 26 may be a first leg or wall 28 extending perpendicularly or roughly perpendicularly from the recessed surface 26. Likewise, disposed on a second side of the recessed surface may be a second leg or wall 30 extending perpendicularly or roughly perpendicularly from the recessed surface 26. On a terminal end 32 of the first leg 28 may be a lip or flange 34. Likewise, on a terminal end 36 of the second leg 30 may be a second lip or flange 38.

Moreover, second slot 22 may have a recessed surface 46, and disposed on a first side of the recessed surface 46 may be a first leg or wall 48 extending perpendicularly or roughly perpendicularly from the recessed surface 46. Likewise disposed on a second side of the recessed surface may be the second leg or wall 30 extending perpendicularly or roughly perpendicularly from the recessed surface 46. On a terminal end 52 of the first leg 48 may be a lip or flange 58. Likewise, on a terminal end 56 of the second leg 30 may be a second lip or flange 58.

Thus, second leg 30 may separate the first slot 20 from the second slot 22. In use, either the first slot 20 or the second slot 22 may be utilized, depending on whether the user wishes to place the clip apparatus on the right side or the left side of the license plate frame 12. As illustrated in FIGS. 2A and 2B, the first legs 28, 48 may be shorter than the second leg 30.

As illustrated in FIG. 3, a cross-sectional view of the clip apparatus 14, license plate frame 12, and the license plate 10, is illustrated. The clip apparatus 14 is illustrated having the license plate frame portion 24 disposed within slot 20. The license plate frame portion 24 may have a front surface 60 bridging a short leg 62 and a long leg 64. The short leg 62 may be held in place by the lip or flange 34 on the first leg or wall 28 wherein the long leg 64 of the license plate frame may be held in place by the lip or flange 38 on the second leg or wall 30. The license plate 10 is illustrated disposed on the license plate frame 12. Therefore the clip apparatus 14 clips onto opposite sides of the license plate frame portion 24, wherein the lips or flanges 34, 38 hold the clip apparatus 14 to the opposite sides of the license plate frame portion 24, thereby holding the clip apparatus 14 on the license plate frame portion 24. Additionally, the license plate frame 12 may be held to the license plate 10 as normal.

The clip apparatus 14 may be easily removable from the license plate frame 12 by pulling on the clip apparatus 14 so that the same comes loose from the license plate frame 12, typically by manually pulling the same. To aid in holding the clip apparatus 14 to the license plate frame 12, a strip of double-sided adhesive may be adhered to the recessed surfaces 26, 46, as necessary. Thus, the clip apparatus 14 may be held to the license plate frame 12 via the lips or flanges 34 and 38 (or 54 and 38) and/or a double-sided adhesive, or any other like adherent known to one of ordinary skill in the art.

Preferably, the clip apparatus 14 comprises two slots, as illustrated above, so that the clip apparatus 14 may be mounted to either the right side or the left side of the license plate frame. However, it should be noted that the present invention may also operate if the clip apparatus 20 comprises only a single slot, whereby moving the clip apparatus 14 from one side of the license plate frame 12 to the other side involves turning the clip apparatus 14 upside down so that it fits on the opposite side of the license plate frame 12.

FIGS. 4-6 illustrate various alternative embodiments of the present invention, showing different indicia that may be presented on the surface 16 of the clip apparatus 14, and various shapes of the clip apparatus 14, whether round or rectangular. The indicia may be printed directly to the surface 16 of the clip apparatus, may be adhered as a sticker or decal, or may be on a plate that may be removably placed on the surface 16 so as to be swapped, as desired. Moreover, other elements may be incorporated into the clip apparatus, such as lights (LEDs, for example), audible elements, such as buzzers or speakers that may emit sound, or any other element utilized to attract attention thereto. In an alternate embodiment, a display screen may be provided on the surface 16 that may be programmed to display different indicia, whether as static images, words, symbols, or the like, or as moving images that may be displayed thereon.

Figure 7:
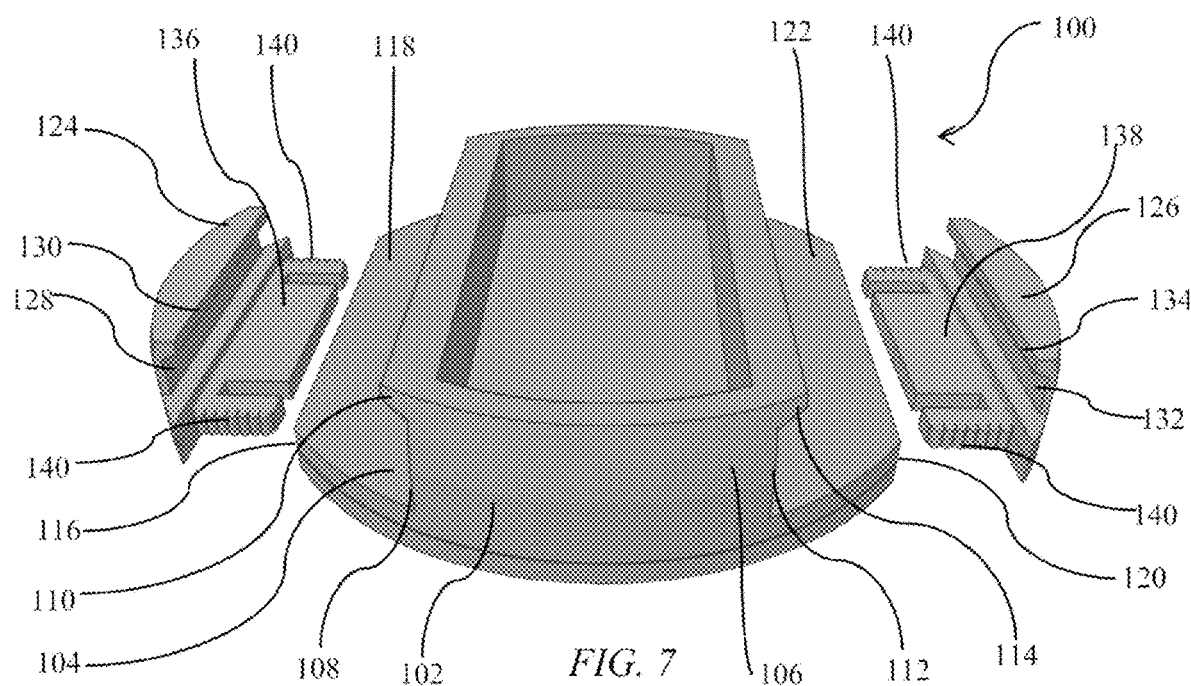
FIG. 7 illustrates a bottom plan view of an adjustable clip apparatus in an embodiment of the present invention.
Figure 8:
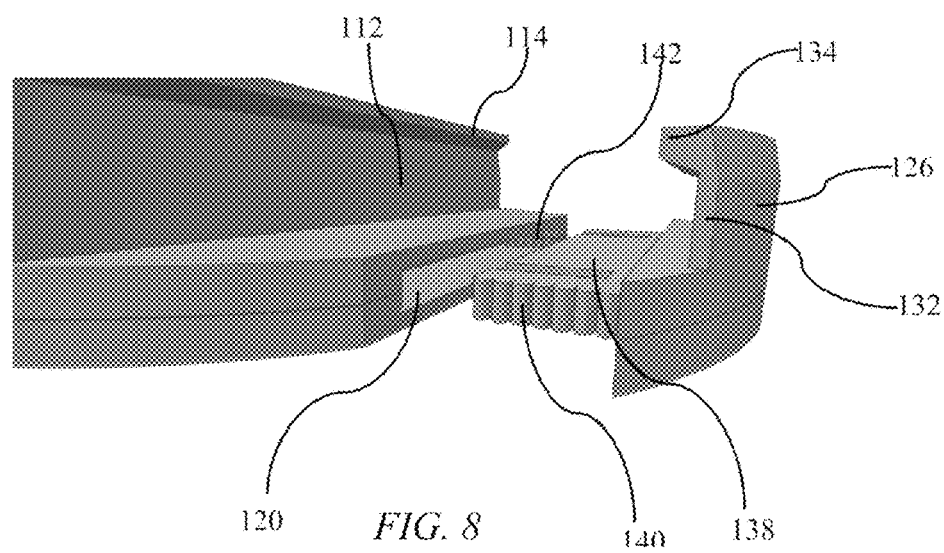
FIG. 8 illustrates a close-up view of an adjustable clip apparatus in an embodiment of the present invention.

FIGS. 7-8 illustrate an adjustable clip apparatus 100 in an alternate embodiment of the present invention. The adjustable clip apparatus 100 comprises a main body 102 comprising a front surface (not shown) and a rear surface 104. A bridging element 106 may be disposed on the rear surface 104 having a first wall 108 having a first flange 110 and a second wall 112 having a second flange 114. A first slot 116 may be disposed in a first side 118 of the main body 102, and a second slot 120 may be disposed in a second side 122 of the main body 102. The first and second slots 116, 120 may be receiving slots for first and second adjustable wings 124, 126 that may be placed within the first and second slots 116, 120, respectively.

The first wing 124 may comprise a first side wall 128 having a first side wall flange 130 on an end thereof. Likewise, second wing 126 may comprise a second side wall 132 having a second side wall flange 134 on an end thereof. Each of the first and second wings 124, 126 may be adjustably disposed within the first and second slots 116, 120 to grip a license plate frame in the same manner as disclosed above with reference to clip apparatus 14, illustrated in FIG. 1. The adjustable first or second wings 124, 126 may thus allow the adjustable clip apparatus 100 to be placed and held in place on different sized license plate frames.

To adjust the first and/or second wings 124, 126, the first and second wings 124, 126 may comprise first and second insert flanges 136, 138, respectively. Sides of the first and second insert flanges 136, 138 may have a plurality of teeth 140 for engaging with mating teeth 142 (as illustrated in FIG. 8) that may be disposed within the first and second slots 116, 120, respectively. The plurality of teeth 140 may be disposed on tabs 144 that may act as leaf springs, allowing the teeth 140 to engage the mating teeth 142 at the proper position, and further making it difficult to pull the first and second wings 124, 126 from the first and second slots 116, 120, respectively.

Thus, in use, the main body 102 may be placed on a license plate frame such that the license plate frame section engages the rear surface 104, and is held in place thereon via the first wall 108 or the second wall 112, held thereon via the first flange 110 or the second flange 114, respectively. Depending on the side of the main body 102 that the license plate frame section engages the main body 102, the first wing 124 or the second wing 126 may engage the first slot 116, or the second slot 120, respectively, the teeth 140 may engage the mating teeth 142 within the first slot 116 or second slot 120 to lock the first wing 124 or the second wing 126 therein, thereby holding the adjustable clip apparatus 100 on the license plate frame, allowing indicia on the front surface to be viewable.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A clip apparatus configured to attach to an automobile license plate frame comprising:
    a body comprising a first surface and a second surface, the first surface comprising indicia thereon, and the second surface configured to attach to an automobile license plate frame, wherein the second surface comprises:
    a first side wall extending from the second surface and a second side wall extending from the second surface, the first side wall and the second side wall running parallel to each other and defining a first slot therebetween, the first side wall having a first tab extending toward the second side wall and extending roughly perpendicular to the first sidewall, the second side wall having a second tab extending toward the first side wall and extending roughly perpendicular to the second sidewall; and
    a third side wall extending from the second surface and a fourth side wall extending from the second surface, the third side wall and the fourth side wall running parallel to each other and defining a second slot therebetween, the third side wall having a third tab extending toward the fourth side wall and extending roughly perpendicular to the third side wall, the fourth side wall having a fourth tab extending toward the third side wall and extending roughly perpendicular to the fourth side wall.

2. The clip apparatus of claim 1 wherein the second side wall adjustably extends from the second surface.

3. The clip apparatus of claim 1 wherein the second side wall comprises an extending flange, and the body comprises a receiving slot configured to accept the extending tab, wherein the position of the second side wall is adjustable by sliding the extending tab into and out of the receiving slot of the body.

4. The clip apparatus of claim 1 wherein the first slot is bounded on sides thereof by the first and second sidewalls and a bottom by the second surface.

5. The clip apparatus of claim 1 wherein the second side wall is longer than the first side wall.

6. The clip apparatus of claim 1 wherein the second slot is bounded on sides thereof by the third and fourth sidewalls and a bottom by the second surface.

7. The clip apparatus of claim 1 wherein the fourth side wall is longer than the third side wall.

8. The clip apparatus of claim 1 wherein the second side wall and the fourth sidewall are connected together to form a single bridging leg between the first and second slots.

9. The clip apparatus of claim 1 wherein the first slot and the second slot run parallel to each other.

10. The clip apparatus of claim 1 further comprising:
an element on the first surface, the element selected from the group consisting of an audio module, a light, a screen, and combinations thereof.

11. The clip apparatus of claim 1 further comprising:
an adhesive within the first slot on the second surface.

12. A system for clipping a clip apparatus to an automobile license plate frame comprising:
a clip apparatus configured to attach to an automobile license plate frame comprising a body comprising a first surface and a second surface, the first surface comprising indicia thereon, and the second surface configured to attach to an automobile license plate frame, wherein the second surface comprises a first side wall extending from the second surface and a second side wall extending from the second surface, the first side wall and the second side wall running parallel to each other and defining a first slot therebetween, the first side wall having a first tab extending toward the second side wall and extending roughly perpendicular to the first sidewall, the second side wall having a second tab extending toward the first side wall and extending roughly perpendicular to the second sidewall, the second surface further comprises a third side wall extending from the second surface and a fourth side wall extending from the second surface, the third side wall and the fourth side wall running parallel to each other and defining a second slot therebetween, the third side wall having a third tab extending toward the fourth side wall and extending roughly perpendicular to the third side wall, the fourth side wall having a fourth tab extending toward the third side wall and extending roughly perpendicular to the fourth side wall; and
an automobile license plate frame comprising a frame section having a front surface, a first side edge and an opposing second side edge, and a rear surface,
wherein the frame section of the automobile license plate frame is positioned within the first slot.

13. The system of claim 12 wherein the first slot is bounded on sides thereof by the first and second sidewalls and a bottom by the second surface, and further wherein the front surface of the frame section is disposed adjacent the second surface of the clip apparatus within the first slot.

14. The system of claim 12 wherein the first tab engages the first side edge of the automobile license plate frame and the second tab engages the second side edge of the automobile license plate frame.

15. The system of claim 12 wherein second side wall and the fourth side wall are connected together to from a single bridging leg between the first and second slots.

16. The system of claim 12 wherein the first slot and the second slot run parallel to each other.

17. The system of claim 12 wherein the first slot comprises an adhesive, wherein the adhesive binds the front surface of the automobile license plate frame to the second surface of the clip apparatus.

18. The system of claim 12 wherein the clip apparatus further comprises an element on the first surface, the element selected from the group consisting of an audio module, a light, a screen, and combinations thereof.

* * * * *